(12) United States Patent
Kanno et al.

(10) Patent No.: US 10,781,758 B2
(45) Date of Patent: Sep. 22, 2020

(54) CONTROL DEVICE FOR INTERNAL COMBUSTION ENGINE

(71) Applicant: TOYOTA JIDOSHA KABUSHIKI KAISHA, Toyota-shi (JP)

(72) Inventors: Yoshihito Kanno, Numazu (JP); Gohki Kinoshita, Isehara (JP); Hiroki Morita, Hiratsuka (JP); Yutaro Kawatsu, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 309 days.

(21) Appl. No.: 15/383,301

(22) Filed: Dec. 19, 2016

(65) Prior Publication Data

US 2017/0184036 A1    Jun. 29, 2017

(30) Foreign Application Priority Data

Dec. 24, 2015   (JP) .................... 2015-251885

(51) Int. Cl.
   *F02D 13/02*   (2006.01)
   *F02N 11/08*   (2006.01)
   (Continued)

(52) U.S. Cl.
   CPC ..... *F02D 13/0226* (2013.01); *F02D 41/0002* (2013.01); *F02D 41/062* (2013.01);
   (Continued)

(58) Field of Classification Search
   CPC ............. F02D 13/0226; F02D 41/0002; F02D 41/062; F02D 41/26; F02D 2041/001;
   (Continued)

(56) References Cited

U.S. PATENT DOCUMENTS 7,743,743 B2 *   6/2010   Inoue ............. F01L 1/352
                                                      123/90.17
8,918,265 B2 *  12/2014   Kang ............. F02D 41/14
                                                      701/102

(Continued)

FOREIGN PATENT DOCUMENTS

JP   2003-184585      7/2003
JP   2005-201185 A    7/2005
(Continued)

*Primary Examiner* — David Hamaoui
*Assistant Examiner* — John D Bailey
(74) *Attorney, Agent, or Firm* — Oblon, McClelland, Maier & Neustadt, L.L.P.

(57) ABSTRACT

A control device is for an internal combustion engine including a throttle valve and a variable valve mechanism, and configured to be operated at a prescribed target air-fuel ratio and capable of restarting from an intermittent stop. The control device includes an electronic control unit configured to start the internal combustion engine after starting an intake air amount reduction control, when a fuel injection amount equal to or larger than a prescribed amount is required and an intermittent stop time is equal to or longer than a prescribed time in a case of the restart from the intermittent stop. The intermittent stop time is a stop time from an immediately preceding intermittent stop to a current restart of the internal combustion engine. The intake air amount reduction control is a control of reducing the intake air amount by operating the variable valve mechanism with the throttle valve kept fully closed.

5 Claims, 9 Drawing Sheets

(51) Int. Cl.
  *F02D 41/26* (2006.01)
  *F02D 41/00* (2006.01)
  *F02D 41/06* (2006.01)

(52) U.S. Cl.
  CPC .......... *F02D 41/26* (2013.01); *F02N 11/0814* (2013.01); *F02D 2041/001* (2013.01); *F02D 2041/002* (2013.01); *F02D 2250/38* (2013.01); *F02N 2300/2011* (2013.01); *Y02T 10/18* (2013.01); *Y02T 10/42* (2013.01); *Y02T 10/48* (2013.01)

(58) Field of Classification Search
  CPC ........... F02D 2041/002; F02D 2250/38; F02D 13/023; F02D 13/0253; F02D 2013/0296; F02D 41/62; F02D 41/065; F02D 41/067; F02D 41/086; F02D 13/02; F02D 41/00; F02N 11/0814; F02N 2300/2011; F02N 11/0829; F02N 11/0833; F02N 11/0844; F02N 11/08; Y02T 10/18; Y02T 10/42; Y02T 10/48
  USPC ....... 123/346, 345, 405, 361, 402, 685, 362, 123/453, 491, 576, 321, 347, 348, 404, 123/179.4; 701/113, 103
  See application file for complete search history.

(56) References Cited

U.S. PATENT DOCUMENTS

| | | | | |
|---|---|---|---|---|
| 8,955,494 | B2* | 2/2015 | Nakamura | B60K 6/48 123/345 |
| 9,222,453 | B2* | 12/2015 | Gibson | F02D 41/042 |
| 2003/0106515 | A1* | 6/2003 | Kondo | F01L 1/053 123/179.4 |
| 2005/0066934 | A1* | 3/2005 | Kawamura | F01L 13/0026 123/325 |
| 2006/0048737 | A1 | 3/2006 | Yoshihara | |
| 2006/0090728 | A1* | 5/2006 | Arinaga | F02D 13/0207 123/339.19 |
| 2006/0212212 | A1* | 9/2006 | Akasaka | F02D 41/0002 701/112 |
| 2007/0181088 | A1* | 8/2007 | Akasaka | B60L 50/16 123/179.4 |
| 2007/0261668 | A1* | 11/2007 | Kataoka | F02D 41/0002 123/319 |
| 2008/0216779 | A1* | 9/2008 | Watanabe | F02D 13/06 123/90.15 |
| 2010/0114461 | A1* | 5/2010 | Gibson | F02D 41/0002 701/112 |
| 2010/0114462 | A1* | 5/2010 | Gibson | F02D 41/0002 701/113 |
| 2010/0235074 | A1* | 9/2010 | Shinagawa | F02D 41/126 701/108 |
| 2011/0231077 | A1* | 9/2011 | Nakamura | B60K 6/48 701/102 |
| 2013/0080036 | A1* | 3/2013 | Yamauchi | F02D 41/042 701/112 |
| 2013/0199496 | A1* | 8/2013 | Gibson | F02D 41/042 123/403 |
| 2013/0231849 | A1* | 9/2013 | Rai | F02D 41/0002 701/112 |
| 2016/0195031 | A1* | 7/2016 | Willems | F02D 41/0087 123/52.1 |
| 2016/0312725 | A1* | 10/2016 | Edington | F02D 41/042 |

FOREIGN PATENT DOCUMENTS

| | | |
|---|---|---|
| JP | 2006-77679 A | 3/2006 |
| JP | 2009-2314 A | 1/2009 |
| JP | 2009-174465 | 8/2009 |
| JP | 2011-17276 A | 1/2011 |

* cited by examiner

CONTROL DEVICE FOR INTERNAL COMBUSTION ENGINE

INCORPORATION BY REFERENCE

The disclosure of Japanese Patent Application No. 2015-251885 filed on Dec. 24, 2015 including the specification, drawings and abstract is incorporated herein by reference in its entirety.

BACKGROUND

1. Technical Field

The present disclosure relates to a control device for an internal combustion engine including a variable valve mechanism.

2. Description of Related Art

There is a control device for an internal combustion engine that controls a variable valve mechanism such that the valve opening timing of an intake valve is retarded to a larger degree and the maximum lift amount is reduced to a larger degree as the coolant temperature becomes lower, when the internal combustion engine is cold (see Japanese Patent Application Publication No. 2009-174465 (JP 2009-174465 A)). With this control, the flow velocity of an air-fuel mixture increases and the heat generated by friction between the air-fuel mixture and the intake valve or the like increases, and thus the vaporization of fuel supplied through port-injection is promoted. In addition, there is a control device that increases the intake air amount by executing control such that the basic valve lift amount of an intake valve increases as the coolant temperature becomes lower, and that increases the intake air amount as the time period over which an internal combustion engine is automatically stopped becomes longer (see Japanese Patent Application Publication No. 2003-184585 (JP 2003-184585 A)).

The number of particulates (PN: particulate number) is an example of an index for regulations on the exhaust gas from an internal combustion engine. The PN increases as the fuel injection amount becomes larger, and the rate of increase in the PN becomes higher as the temperature in a combustion chamber (in-cylinder temperature) becomes lower.

The control device described in JP 2009-174465 A reduces the intake air amount as the engine temperature becomes lower. However, the difference between the engine temperature and the in-cylinder temperature is large in some cases, and therefore the in-cylinder temperature may be so low that the PN increases even when the engine temperature is high. Further, the control for reducing the intake air amount is continued while the engine temperature is low, and therefore the time period over which engine output is restricted may be prolonged. The control device of JP 2003-184585 A increases the intake air amount as the automatic stop time period becomes longer. With an increase in the intake air amount, the fuel injection amount increases and thus the PN increases.

SUMMARY

The present disclosure provides a control device for an internal combustion engine, the control device configured to inhibit an increase in the particulate number (PN).

A first aspect of the present disclosure relates to a control device for an internal combustion engine. The internal combustion engine includes a throttle valve that adjusts an opening degree of an intake passage and a variable valve mechanism capable of adjusting an intake air amount. The internal combustion engine is configured to be operated at a prescribed target air-fuel ratio. The internal combustion engine is configured to be capable of restarting from an intermittent stop. The control device includes an electronic control unit configured to start the internal combustion engine after starting an intake air amount reduction control, when a fuel injection amount equal to or larger than a prescribed amount is required and an intermittent stop time is equal to or longer than a prescribed time in a case of the restart from the intermittent stop. The intermittent stop time is a stop time from an immediately preceding intermittent stop of the internal combustion engine to a current restart of the internal combustion engine. The intake air amount reduction control is a control of reducing the intake air amount by operating the variable valve mechanism with the throttle valve kept fully closed.

In the internal combustion engine capable of making an intermittent stop, after the operation of the internal combustion engine stops, the in-cylinder temperature decreases as the stop time becomes longer, and the PN increases at the time of restart of the internal combustion engine. Therefore, when a fuel injection amount equal to or larger than the prescribed amount is required at the time of restart from intermittent stop, the PN is likely to increase if the operation, in which the fuel is injected in the required amount, is executed at the target air-fuel ratio. With the control device, when a fuel injection amount equal to or larger than the prescribed amount is required and the intermittent stop time is equal to or longer than the prescribed time, the internal combustion engine is started after the intake air amount reduction control of reducing the intake air amount is started. Thus, an increase in the PN can be inhibited because the fuel injection amount is reduced with a reduction in the intake air amount in order to maintain the target air-fuel ratio.

In the control device according to the above aspect, the electronic control unit may be configured to control the internal combustion engine such that the intake air amount reduction control is executed over a longer time as the intermittent stop time becomes longer.

As the intermittent stop time becomes longer, the in-cylinder temperature decreases to a larger extent and thus it takes longer for the in-cylinder temperature to increase. According to this aspect, it is possible to inhibit an increase in the PN while preventing the time period over which the output is reduced due to the execution of the intake air amount reduction control from being unnecessarily prolonged.

In the control device according to the above aspect, the variable valve mechanism may be configured to select one of a small lift mode and a large lift mode, the electronic control unit may be configured to execute the intake air amount reduction control by selecting the small lift mode, and the electronic control unit may be configured to end the intake air amount reduction control within a time range set before a time at which a magnitude relationship between an air load factor when the small lift mode is selected with the throttle valve kept fully closed and an air load factor when the large lift mode is selected with the throttle valve kept fully closed is reversed.

According to this aspect, the intake air amount reduction control can be executed before the time at which magnitude relationship between the air load factor when the small lift mode is selected and the air load factor when the large lift mode is selected is reversed. The intake air amount after the air amount reduction control ends may be made larger than that before the air amount reduction control ends.

Note that, "throttle valve is fully closed" means that the opening degree of the throttle valve is the minimum opening degree in the system, and does not necessarily mean that the intake passage is completely closed.

As described above, with the control device according to the present disclosure, when a fuel injection amount equal to or larger than the prescribed amount is required and an intermittent stop time is equal to or longer than the prescribed time, the internal combustion engine is started after the intake air amount reduction control of reducing the intake air amount is started. Thus, an increase in the PN can be inhibited because the fuel injection amount is reduced with a reduction in the intake air amount in order to maintain the target air-fuel ratio.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
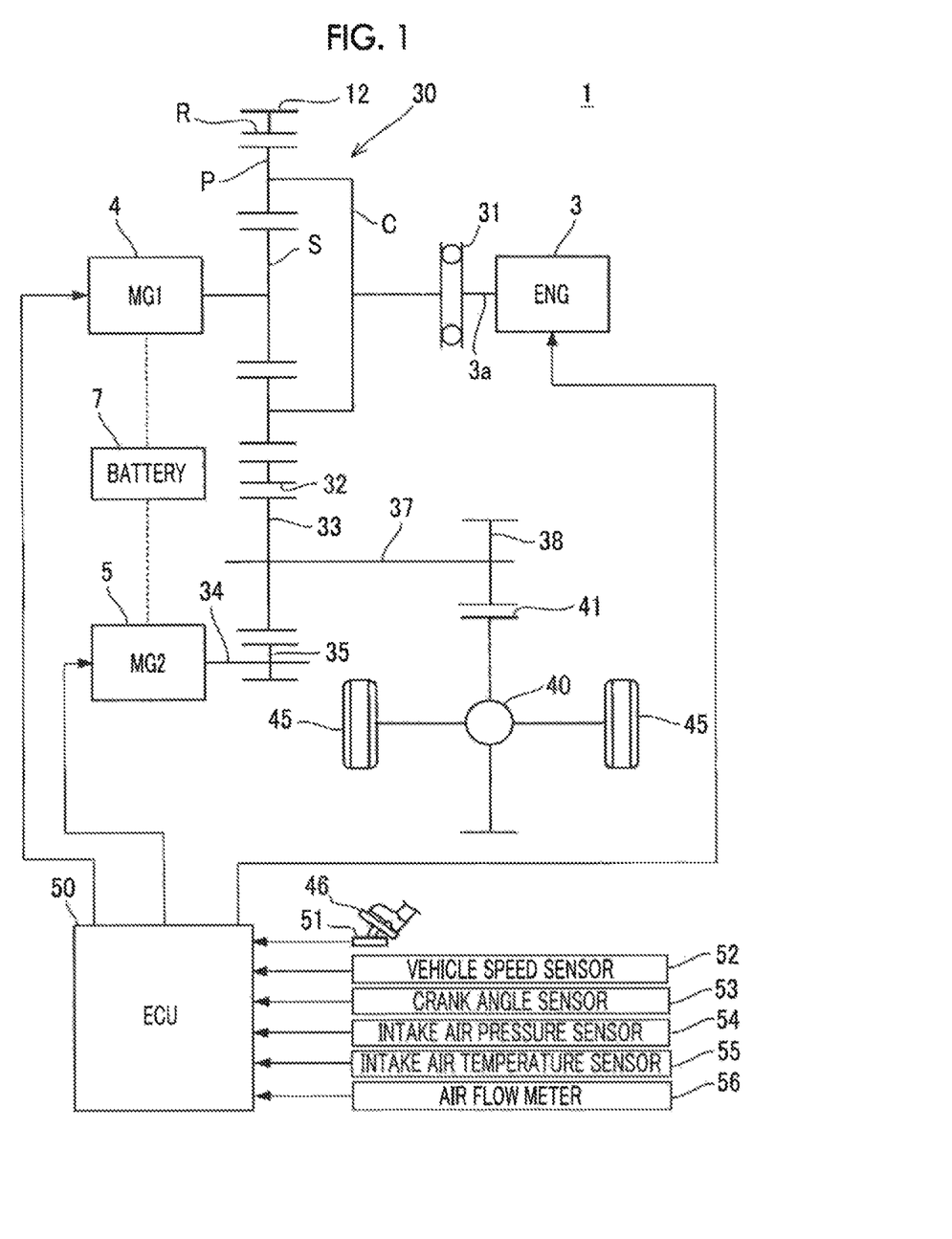
FIG. 1 is a diagram illustrating the overall configuration of a hybrid vehicle provided with a control device according to a first embodiment.

Hereinafter, a first embodiment will be described with reference to the accompanying drawings. As illustrated in FIG. 1, a vehicle 1 is a hybrid vehicle provided with a plurality of power sources used in combination. The vehicle 1 includes an internal combustion engine 3, and two motor generators 4, 5, as power sources for traveling. The internal combustion engine 3 is a reciprocating spark-ignition internal combustion engine. The internal combustion engine 3 is operated at a prescribed target air-fuel ratio (e.g. the stoichiometric air-fuel ratio).

Figure 2:
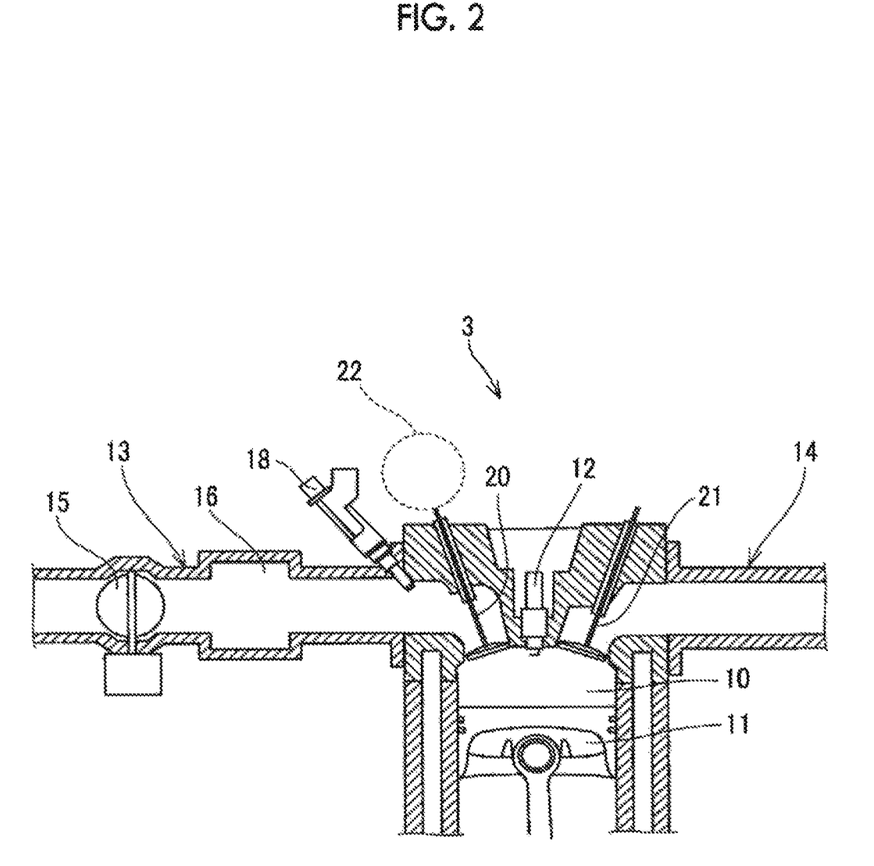
FIG. 2 is a view illustrating the details of an internal combustion engine mounted in the hybrid vehicle in FIG. 1.

As illustrated in FIG. 2, the internal combustion engine 3 includes a plurality of cylinders 10, and a piston 11 is reciprocably disposed in each cylinder 10. Note that, one of the cylinders 10 is illustrated in FIG. 2. Each cylinder 10 is provided with a spark plug 12, and is connected to an intake passage 13 and an exhaust passage 14. The intake passage 13 is provided with a throttle valve 15 and a surge tank 16. The opening degree of the throttle valve 15 is adjustable. The surge tank 16 reduces the intake air pulsation. A fuel injection valve 18 for supplying fuel is disposed downstream of the surge tank 16, with a distal end thereof exposed in the intake passage 13. The intake passage 13 is opened and closed by an intake valve 20. The intake valve 20 is driven by a variable valve mechanism 22 configured to adjust the intake air amount. Although the details are not illustrated, the variable valve mechanism 22 has a known configuration including a variable valve timing mechanism and a variable valve lift mechanism. The variable valve timing mechanism is configured to vary the opening timing of the intake valve 20. The variable valve lift mechanism is configured to switch the operation mode between a large lift mode and a small lift mode. In the large lift mode, the lift amount and the valve duration are both relatively large. In the small lift mode, the lift amount and the valve duration are both relatively small. Note that "valve duration" means the length of time, in degrees, that a valve is held open. The exhaust passage 14 is opened and closed by an exhaust valve 21. The exhaust valve 21 is driven by a valve mechanism (not illustrated) at a prescribed timing in conjunction with the operation of the piston 11. The internal combustion engine 3 may be an in-cylinder direct injection spark-ignition internal combustion engine. The variable valve mechanism 22 may be a variable valve mechanism configured to continuously vary the operation mode in order to vary the intake air amount.

As illustrated in FIG. 1, the internal combustion engine 3 and the first motor generator 4 are coupled to a power split mechanism 30. The first motor generator 4 functions as an electric generator that generates electricity from the power generated by the internal combustion engine 3 and then split by the power split mechanism 30, and functions also as an electric motor that is driven by alternating-current (AC) power. Similarly, the second motor generator 5 functions as an electric motor, and functions also as an electric generator. Each of the first motor generator 4 and the second motor generator 5 is electrically connected to a battery 7.

The power split mechanism 30 is a single-pinion planetary gear mechanism. The power split mechanism 30 includes a sun gear S that is an external gear, a ring gear R that is an internal gear disposed coaxially with the sun gear S, and a planetary carrier C that holds pinions P meshed with the sun gear S and the ring gear R such that the pinions P can rotate about their axes and revolve around the sun gear S. The engine torque output from the internal combustion engine 3 is transmitted to the planetary carrier C of the power split mechanism 30 via a torsional damper 31. A crankshaft 3a of the internal combustion engine 3 is coupled to the input side of the torsional damper 31, and the planetary carrier C is coupled to the output side of the torsional damper 31. The first motor generator 4 is coupled to the sun gear S of the power split mechanism 30.

An output gear 32 that is an external gear is disposed on the outer periphery of the ring gear R of the power split mechanism 30. The output gear 32 is meshed with the driven gear 33. A motor gear 35 meshed with the driven gear 33 is disposed on a motor shaft 34 of the second motor generator 5. The driven gear 33 is secured to a countershaft 37, and a drive gear 38 is secured to the countershaft 37. The drive gear 38 is meshed with a ring gear 41 of a differential mechanism 40. With this configuration, the torque output from the output gear 32 and the motor torque of the second motor generator 5 are transmitted to the differential mechanism 40 via the driven gear 33 and drive gear 38. The torque transmitted to the differential mechanism 40 is distributed to right and left drive wheels 45.

As is clear from the configuration of the vehicle 1, by controlling the motor torque and motor speed of the first motor generator 4 coupled to the power split mechanism 30, the operating point of the internal combustion engine 3 can be varied with the rotational speed of the output gear 32 maintained, that is, with the vehicle speed maintained. Note that, the operating point of the internal combustion engine 3 is defined by the engine speed and engine torque (load) of the internal combustion engine 3.

Various components of the vehicle 1 are controlled by an electronic control unit (ECU) 50 that is a computer. The ECU 50 executes various controls on the internal combustion engine 3, the motor generators 4, 5 and so forth. The ECU 50 receives various kinds of information about the vehicle 1. The ECU 50 receives, for example, an output signal from an accelerator position sensor 51 that outputs a signal corresponding to an amount of depression of an accelerator pedal 46, an output signal from a vehicle speed sensor 52 that outputs a signal corresponding to a vehicle speed of the vehicle 1, an output signal from a crank angle sensor 53 that outputs a signal corresponding to a crank angle of the internal combustion engine 3, an output signal from an intake air pressure sensor 54 that outputs a signal corresponding to a pressure (intake air pressure) in the surge tank 16, an output signal from an intake air temperature sensor 55 that outputs a signal corresponding to a temperature (intake air temperature) in the surge tank 16, an output signal from an air flow meter 56 disposed upstream of the throttle valve 15, and so forth.

The ECU 50 calculates a required output required by a driver, based on an output signal from the accelerator position sensor 51 and an output signal from the vehicle speed sensor 52. Then, the ECU 50 controls the vehicle 1 while making the switchover among various modes, such that the system efficiency for the request output is optimized. For example, in a low load range in which the thermal efficiency of the internal combustion engine 3 becomes low, an electric vehicle (EV) mode is selected. In the EV mode, the combustion in the internal combustion engine 3 is stopped and the second motor generator 5 is driven. On the other hand, for example, when sufficient torque cannot be obtained by using only the internal combustion engine 3, or when the remaining battery level of the battery 7 is insufficient, a hybrid mode is selected. In the hybrid mode, the internal combustion engine 3 or the combination of the internal combustion engine 3 and the second motor generator 5 is used as a power source for traveling.

When the operating condition changes while the vehicle 1 is traveling, the ECU 50 stops the combustion in the internal combustion engine 3 to make the switchover from the hybrid mode to the EV mode, or starts the internal combustion engine 3 to make the switchover from the EV mode to the hybrid mode. Thus, in the vehicle 1, an intermittent operation mode is executed, as a feature of a hybrid vehicle. In the intermittent operation mode, the start and stop of the internal combustion engine 3 are repeated within a relatively short time period. Stopping the internal combustion engine 3 to make the switchover from the hybrid mode to the EV mode during the execution of the intermittent operation mode will be referred to as "intermittent stop". The present embodiment is characterized by the control that is executed when the internal combustion engine 3 is restarted from the intermittent stop. Hereinafter, the control executed by the ECU 50 will be described with reference to FIGS. 3 to 8.

In the internal combustion engine 3, the operation mode is selected from the large lift mode and the small lift mode through the operation of the variable valve mechanism 22 as described above. Which of these operation modes is selected is determined based on the operating range of the internal combustion engine 3.

Figure 3:
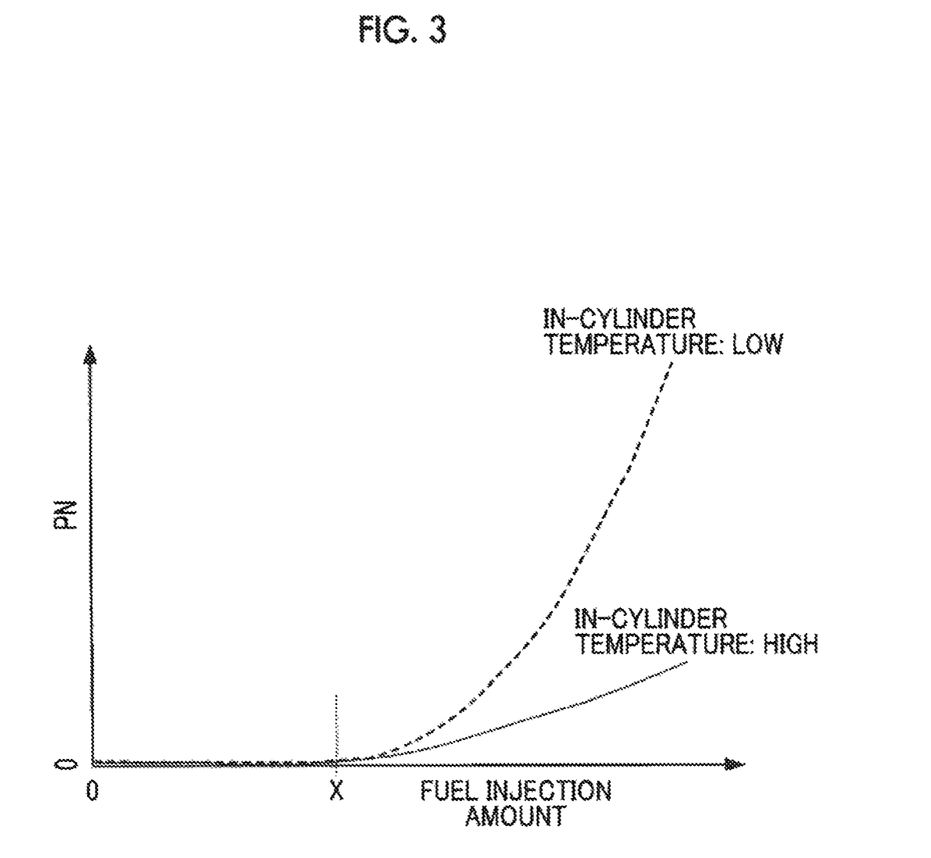
FIG. 3 is a graph illustrating the relationship between the fuel injection amount and the particulate number (PN) in each of a case where the in-cylinder temperature is low and a case where the in-cylinder temperature is high.

The relationship between the fuel injection amount and the particulate number (PN) has been briefly described above. This relationship is not a simple proportional relationship, and the PN exponentially increases when the fuel injection amount becomes equal to or larger than a critical point X, as illustrated in FIG. 3. When the fuel injection amount is below the critical point X, the PN is small regardless of the in-cylinder temperature. This is presumed to be because un-vaporized fuel is not generated when the fuel injection amount is below the critical point X. On the other hand, when the fuel injection amount is equal to or larger than the critical point X, the rate of increase in the PN becomes higher as the in-cylinder temperature becomes lower (i.e., the lower the in-cylinder temperature is, the higher the rate of increase in the PN is). This is presumed to be because, even when the un-vaporized fuel is generated, the amount of generated un-vaporized fuel becomes smaller as the in-cylinder temperature becomes higher (i.e, the higher the in-cylinder temperature is, the smaller the amount of generated un-vaporized fuel is). In view of this, the PN increases as the in-cylinder temperature becomes lower, when the fuel injection amount is equal to or larger than the critical point X.

Figure 4:
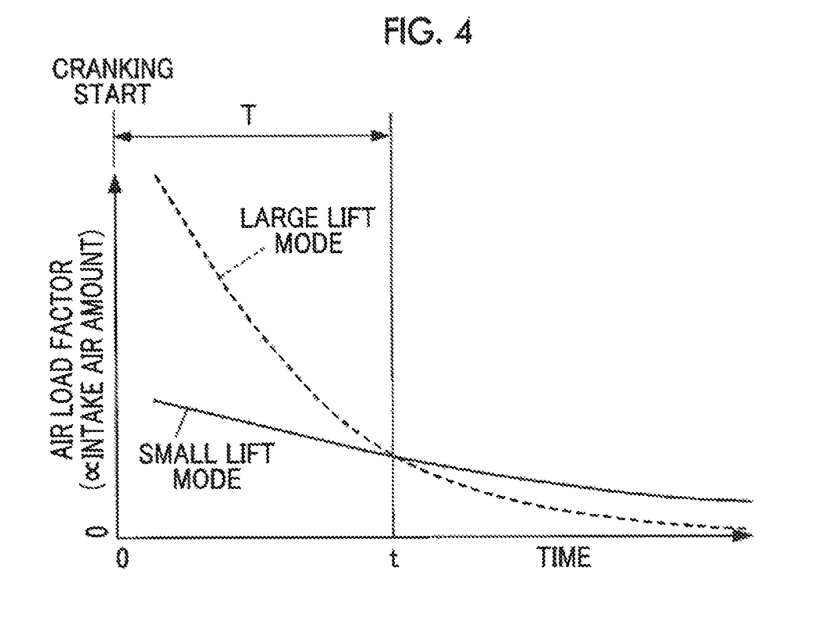
FIG. 4 is a graph illustrating a temporal variation in the air load factor when cranking is performed with a throttle valve kept fully closed, in each of a large lift mode and a small lift mode.

At the time of restart of the internal combustion engine 3 from the intermittent stop, the ECU 50 causes the throttle valve 15 to fully close at the start of cranking in order to rapidly generate manifold vacuum thereby promoting the vaporization of fuel. The restart of the internal combustion engine 3 is performed using the air in the surge tank 16. Note that, "fully closed" means the minimum opening degree in the system. The throttle valve 15 is kept fully closed during several cycles after sufficient combustion of the air-fuel mixture occurs in the internal combustion engine 3. FIG. 4 illustrates a temporal variation in the air load factor when cranking is performed with the throttle valve 15 kept fully closed, in each of the large lift mode and the small lift mode. As is apparent from FIG. 4, the air load factor decreases with the lapse of time in each of the large lift mode and the small lift mode, but the magnitude relationship between the air load factor in the large lift mode and the air load factor in the small lift mode is reversed before and after a prescribed time t. It can be understood that, within a time period T from the start of cranking to the prescribed time t, the intake air amount becomes smaller when the small lift mode is selected than when the large lift mode is selected, whereas after the prescribed time t, the intake air amount becomes larger when the small lift mode is selected than when the large lift mode is selected.

Figure 5:
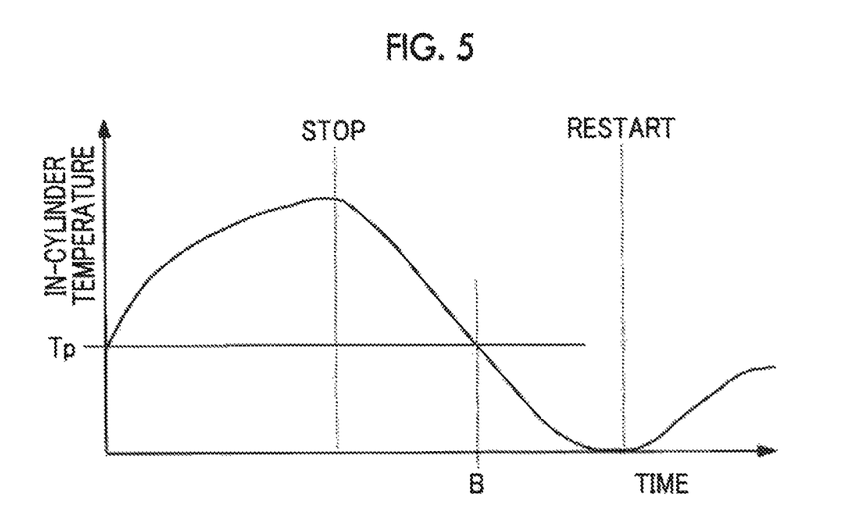
FIG. 5 is a graph illustrating the relationship between the intermittent stop time and the in-cylinder temperature.

In view of this, the ECU 50 starts the intake air amount reduction control for reducing the intake air amount by selecting the small lift mode when a prescribed condition is satisfied. Then, the ECU 50 ends the intake air amount reduction control within the time range of the time period T from the start of cranking to the prescribed time t. That is, the intake air amount reduction control ends within the time range set before the prescribed time t. The intake air amount reduction control is executed over a longer time as the intermittent stop time becomes longer. The intermittent stop time is a period of time from the immediately preceding stop of the internal combustion engine 3 to the current restart of the internal combustion engine 3. Note that, "restart time" means the start time of cranking. The in-cylinder temperature becomes lower as the intermittent stop time becomes longer, as illustrated in FIG. 5. Thus, it takes a long time for the in-cylinder temperature to exceed a prescribed temperature Tp above which the PN is small, after the restart of the internal combustion engine 3. Thus, the ECU 50 executes the intake air amount reduction control over a longer time within the time range of the time period T (FIG. 4) as the intermittent stop time becomes longer. Particularly, when the intermittent stop time is shorter than, for example, a prescribed time B, the in-cylinder temperature does not fall below the prescribed temperature Tp and thus the PN does not increase, as illustrated in FIG. 5. Therefore, the ECU 50 executes the intake air amount reduction control when the intermittent stop time is equal to or longer than the prescribed time B, whereas the ECU 50 does not execute the intake air amount reduction control when the intermittent stop time is shorter than the prescribed time B.

Figure 6:
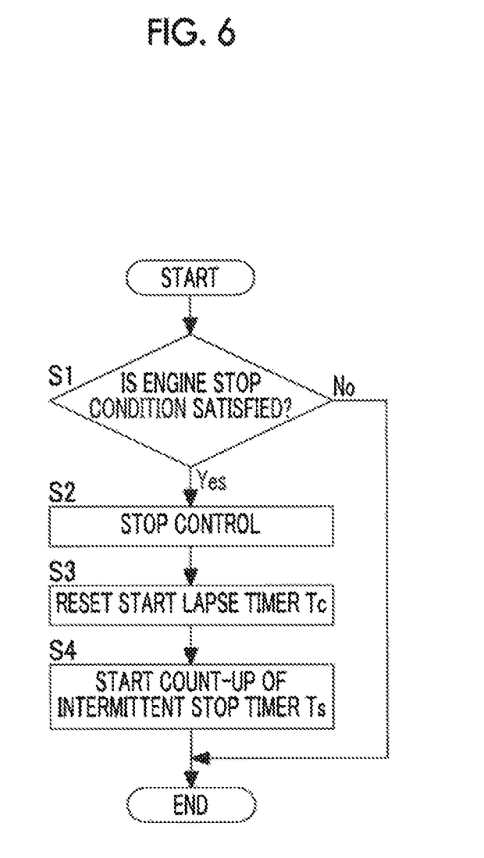
FIG. 6 is a flowchart illustrating an example of a control routine according to the first embodiment, which is used to stop the internal combustion engine.
Figure 7:
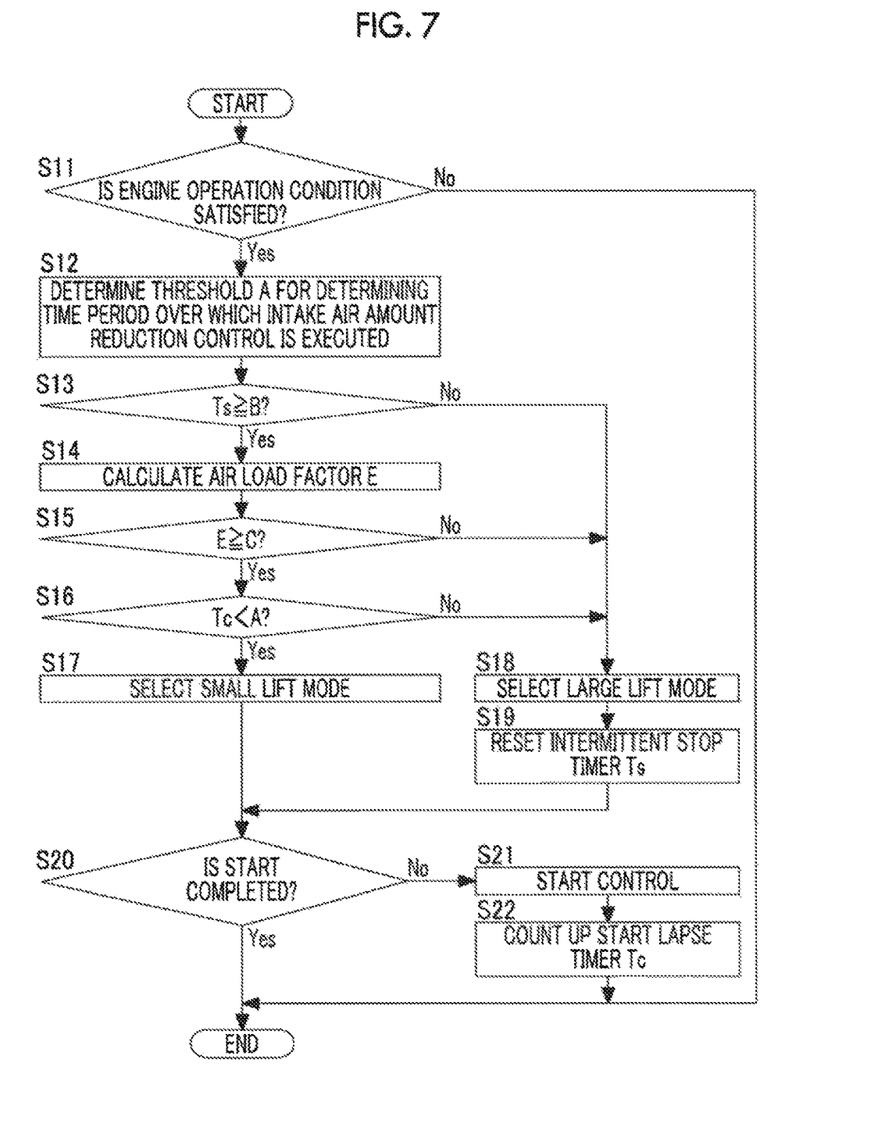
FIG. 7 is a flowchart illustrating an example of a control routine according to the first embodiment, which is used for the restart and subsequent operation of the internal combustion engine.

In an example of a mode for carrying out such a control, the ECU 50 executes control routines illustrated in FIG. 6 and FIG. 7 in parallel with each other. Programs of the control routines in FIG. 6 and FIG. 7 are stored in the ECU 50, and are read at appropriate times and repeatedly executed at prescribed intervals. In this way, the ECU 50 functions as a control device according to the present embodiment.

The internal combustion engine 3 is stopped according to the control routine in FIG. 6. First, in step S1, the ECU 50 determines whether an engine stop condition is satisfied. For example, the ECU 50 recognizes the state of the vehicle 1 based on an output signal from the accelerator position sensor 51 and an output signal from the vehicle speed sensor 52, and the ECU 50 determines that the engine stop condition is satisfied, for example, when the vehicle 1 has been stopped or when the required output is low and traveling in the EV mode is preferable. When the engine stop condition is satisfied, the process proceeds to step S2. On the other hand, when the engine stop condition is not satisfied, subsequent processes are skipped and the current routine ends.

In step S2, the ECU 50 executes a control of stopping the internal combustion engine 3. The stop control is a well-known control including stopping the crank shaft at a crankshaft position corresponding to a prescribed piston position in preparation for the restart of the internal combustion engine 3, and therefore the details of the stop control will be omitted. Then, in step S3, the ECU 50 resets a start lapse timer Tc. The start lapse timer Tc is a variable for managing the time that has elapsed from the restart of the internal combustion engine 3. In step S4, the ECU 50 starts count-up of an intermittent stop timer Ts. Then, the ECU 50 ends the current routine. The intermittent stop timer Ts is a variable for managing the time that has elapsed from the stop of the internal combustion engine 3. After the start of count-up, the intermittent stop timer Ts is sequentially updated according to the time that has elapsed from the stop of the internal combustion engine 3.

The restart of the internal combustion engine 3 from the intermittent stop and the subsequent operation thereof are executed according to the control routine in FIG. 7. In step S11, the ECU 50 determines whether an engine operation condition is satisfied. The ECU 50 determines whether the engine operation condition is satisfied by recognizing the state of the vehicle 1, as in the case of determining whether the engine stop condition is satisfied. The ECU 50 determines that the engine operation condition is satisfied, for example, when the internal combustion engine 3 needs to be restarted to make the switchover to the hybrid mode, for example, when the required output is increased while the vehicle 1 is traveling in the EV mode.

In step S12, the ECU 50 sets a threshold A such that the threshold A becomes larger as the value of the intermittent stop timer Ts becomes larger, based on the value of the intermittent stop timer Ts. The threshold A is used to determine a time period over which the intake air amount reduction control is executed, and is set within the time range of the time period T illustrated in FIG. 4. Thus, the intake air amount reduction control is executed so as to end before the time at which the magnitude relationship between the air load factor when the large lift mode is selected and the air load factor when the small lift mode is selected is reversed.

In step S13, the ECU 50 determines whether the value of the intermittent stop timer Ts is equal to or larger than the value of the prescribed time B based on the intermittent stop timer Ts (see FIG. 5). The prescribed time B is set in order to prevent the intake air amount reduction control from being executed in the case of a short intermittent stop in which an amount of decrease in the in-cylinder temperature is small and the PN does not increase, as described above. When the value of the intermittent stop timer Ts is equal to or larger than the value of the prescribed time B, the process proceeds to step S14. On the other hand, when the value of the intermittent stop timer Ts is smaller than the value of the prescribed time B, the process proceeds to step S18.

In step S14, the ECU 50 reads a required operating point that is calculated in another routine (not illustrated) and used when the internal combustion engine 3 is restarted. The ECU 50 calculates an air load factor E corresponding to the required operating point. The air load factor E is a ratio of the amount of intake air that is actually taken into the internal combustion engine 3 during one cycle of the internal combustion engine 3 to the maximum amount of air that can be taken into the internal combustion engine 3 during one cycle of the internal combustion engine 3. The air load factor E is proportional to the intake air amount. The internal combustion engine 3 is operated such that the target air-fuel ratio is kept constant, and thus the air load factor E is proportional to the fuel injection amount. That is, the fuel injection amount becomes larger as the air load factor E becomes higher.

An intake air amount Ga that is the amount of air actually taken into the internal combustion engine 3 is required for calculation of the air load factor E. As described above, the intake air amount reduction control is executed with the throttle valve 15 kept fully closed. Therefore, the intake air amount Ga cannot be calculated based on an output signal from the air flow meter 56 disposed upstream of the throttle valve 15. Therefore, the intake air amount Ga is calculated according to an equation, $Ga=\rho*\eta*V$. In this case, $\rho$ is an air density and is calculated based on the intake air pressure and the intake air temperature, $\eta$ is a volumetric efficiency and is calculated based on the engine speed, the intake air pressure, and the valve timing, and V is a known cylinder volume. The intake air pressure is acquired based on an output signal from the intake air pressure sensor 54, the intake air temperature is acquired based on an output signal from the intake air temperature sensor 55, and the engine speed and the valve timing are acquired based on an output signal from the crank angle sensor 53. Thus, the intake air amount Ga is calculated without using an output signal from the air flow meter 56. In another routine (not illustrated), the ECU 50 calculates a fuel injection amount with which the target air-fuel ratio is achieved at the intake air amount Ga calculated as described above, and controls the fuel injection valve 18 such that fuel in the calculated fuel injection amount is injected. Thus, the intake air amount reduction control is executed at the target air-fuel ratio.

Next, in step S15, the ECU 50 determines whether the air load factor E is equal to or higher than a threshold C. The threshold C is set as an air load factor corresponding to the fuel injection amount with which the PN increases when the internal combustion engine 3 is restarted from the intermittent stop. Therefore, "when the air load factor E is equal to or higher than the threshold C" is an example of "when a fuel injection amount equal to or larger than a prescribed amount is required".

In step S16, the ECU 50 determines whether the value of the start lapse timer Tc is smaller than the threshold A. When the value of the start lapse timer Tc is smaller than the threshold A, the process proceeds to step S17 in which the small lift mode is selected. Thus, the intake air amount reduction control is executed. On the other hand, when the value of the start lapse timer Tc is equal to or larger than the threshold A, the process proceeds to step S18 in which the large lift mode is selected. In step S19, the ECU 50 resets the intermittent stop timer Ts.

In step S20, the ECU 50 determines whether the start of the internal combustion engine 3 is completed. The ECU 50 makes this determination based on whether the engine speed exceeds a start completion determination value, with reference to an output signal from the crank angle sensor 53. When the start of the internal combustion engine 3 is completed, the current routine ends. On the other hand, when the start of the internal combustion engine 3 is not completed, the process proceeds to step S21 in which the start control is executed. In step S22 executed subsequent to step S21, the ECU 50 counts up the start lapse timer Tc. For example, the ECU 50 counts up the start lapse timer Tc by updating the value of the start lapse timer Tc to a value obtained by adding 1 to the current value of the start lapse timer Tc. Then, the ECU 50 ends the current routine.

According to the present embodiment, the internal combustion engine 3 is started after the start of the intake air amount reduction control in which the small lift mode is selected when the air load factor E is equal to or higher than the threshold C and the intermittent stop time is equal to or longer than the prescribed time B in the case of the restart of the internal combustion engine 3 from the intermittent stop. Therefore, an increase in the PN can be inhibited because the fuel injection amount is reduced with a reduction in the intake air amount in order to maintain the target air-fuel ratio.

As described above, the threshold A for determining the time period over which the intake air amount reduction control is executed is set to a larger value as the value of the intermittent stop timer Ts becomes larger, and the value of the intermittent stop timer Ts becomes larger as the intermittent stop time becomes longer. Therefore, the intake air amount reduction control is executed over a longer time as the intermittent stop time becomes longer. Thus, it is possible to inhibit an increase in the PN while preventing the time period over which the output is reduced due to the execution of the intake air amount reduction control from being unnecessarily prolonged. Further, in the present embodiment, the intake air amount reduction control is executed with the throttle valve 15 kept fully closed. Thus, when the internal combustion engine 3 is restarted from the intermittent stop, manifold vacuum promptly occurs and the vaporization of fuel is promoted. Thus, it is possible to obtain an effect of reducing the PN.

Next, a second embodiment will be described with reference to FIGS. 8 to 10. The physical configuration and basic control in the second embodiment are similar to those in the first embodiment, but the second embodiment differs from the first embodiment in that a cumulative air amount is used as a parameter for determining a time period over which the intake air amount reduction control is executed. The physical configuration in the second embodiment is the same as that in FIG. 1 and FIG. 2, and therefore description thereof will be omitted. Further, description of the processes in the second embodiment, which are the same as those in the first embodiment, will be omitted or simplified.

Figure 8:
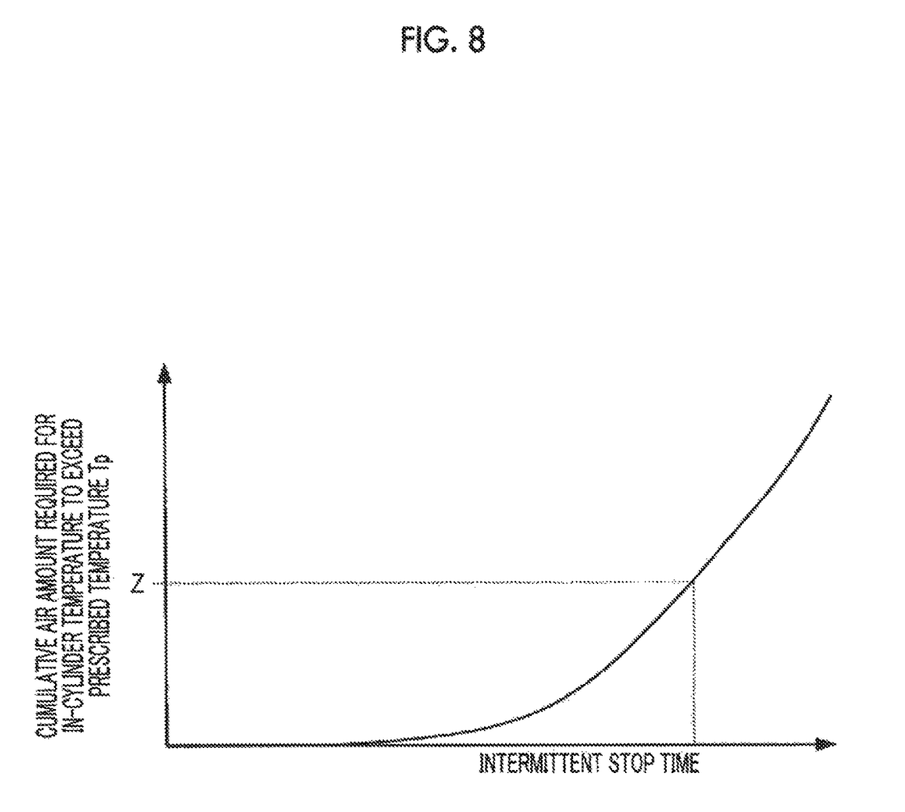
FIG. 8 is a graph illustrating the relationship between the intermittent stop time and the cumulative air amount required for the in-cylinder temperature to exceed a prescribed temperature above which the PN is small, after the restart of the internal combustion engine.

As illustrated in FIG. 8, the intermittent stop time and the cumulative air amount required for the in-cylinder temperature to exceed the prescribed temperature Tp (see FIG. 5) above which the PN is small after the restart of the internal combustion engine have a non-linear relationship, instead of a proportional relationship. That is, the rate of increase in the cumulative air amount required for the in-cylinder temperature to exceed the prescribed temperature Tp is not constant, and becomes higher as the intermittent stop time becomes longer. In view of this, the cumulative air amount set based on the intermittent stop time according to the graph in FIG. 8 is set as a threshold Z, and the intake air amount reduction control is executed until the cumulative air amount reaches the threshold Z after the restart of the internal combustion engine 3 from the intermittent stop. In this way, an increase in the PN is sufficiently inhibited. In the control in the present embodiment, the cumulative air amount is used based on such a concept.

Figure 9:
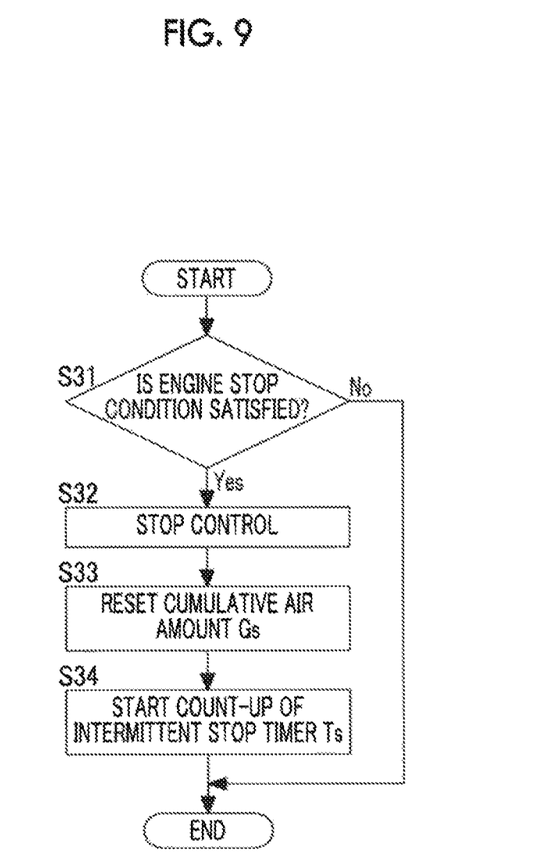
FIG. 9 is a flowchart illustrating an example of a control routine according to a second embodiment, which is used to stop the internal combustion engine.
Figure 10:
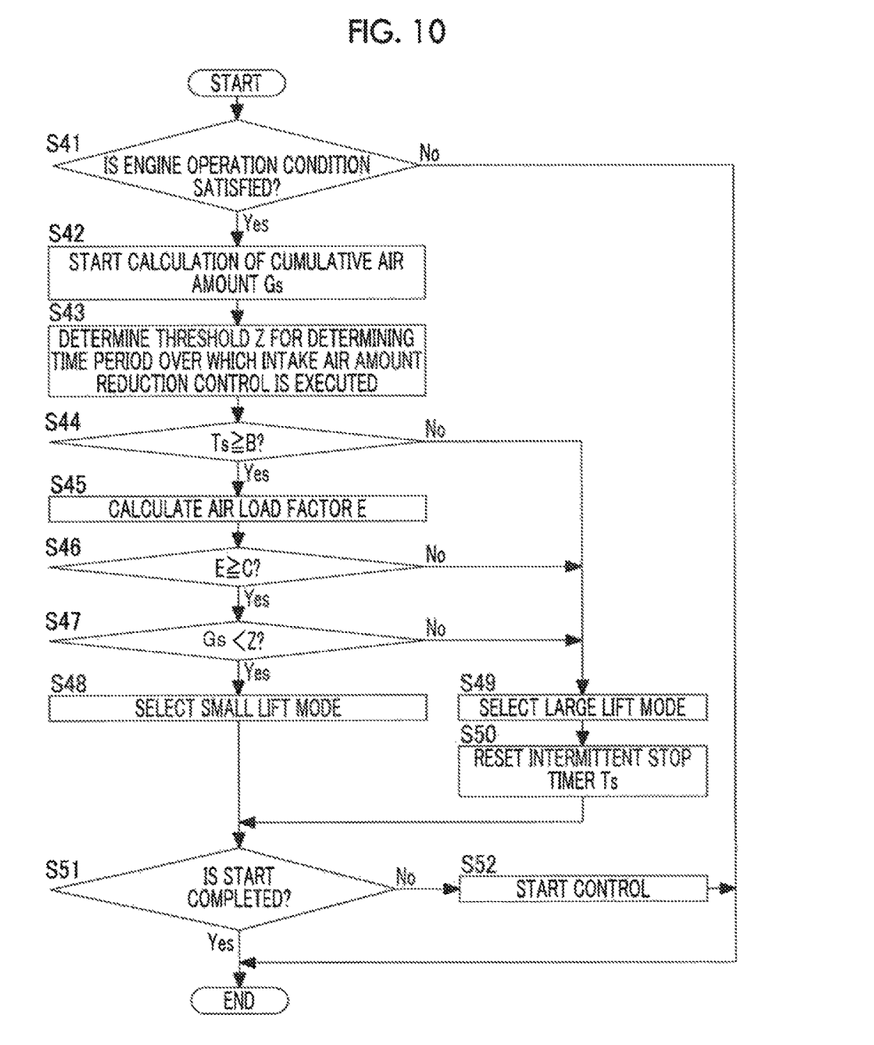
FIG. 10 is a flowchart illustrating an example of a control routine according to the second embodiment, which is used for the restart and subsequent operation of the internal combustion engine.

The control in the present embodiment is executed when the ECU 50 executes control routines in FIG. 9 and FIG. 10. Programs of the control routines in FIG. 9 and FIG. 10 are stored in the ECU 50, and are read at the appropriate times and repeatedly executed at prescribed intervals. In this way, the ECU 50 functions as a control device according to the present embodiment.

The internal combustion engine 3 is stopped according to the control routine in FIG. 9. First, in step S31, the ECU 50 determines whether an engine stop condition is satisfied. When the engine stop condition is satisfied, the process proceeds to step S32. On the other hand, when the engine stop condition is not satisfied, subsequent processes are skipped and the current routine ends.

In step S32, the ECU 50 executes a control of stopping the internal combustion engine 3. Then, in step S33, the ECU 50 resets a cumulative air amount Gs that is an amount of air taken into the internal combustion engine 3. The cumulative air amount Gs is a variable set in the ECU 50, and is sequentially updated from the start of calculation of the cumulative air amount Gs until the cumulative air amount Gs is reset. In step S34, the ECU 50 starts count-up of the intermittent stop timer Ts. Then, the ECU 50 ends the current routine.

The restart of the internal combustion engine 3 from the intermittent stop and the subsequent operation thereof are executed according to the control routine in FIG. 10. In step S41, the ECU 50 determines whether an engine operation condition is satisfied. When the engine operation condition is satisfied, the process proceeds to step S42. On the other hand, when the engine operation condition is not satisfied, the subsequent processes are skipped, and the current routine ends.

In step S42, the ECU 50 starts the calculation of the cumulative air amount Gs. The cumulative air amount Gs is calculated based on the current intake air amount Ga. The intake air amount Ga is calculated in the same method as that in the first embodiment.

In step S43, the ECU 50 determines a threshold Z of the cumulative air amount Gs, for determining a time period over which the intake air amount reduction control is executed. Specifically, the ECU 50 stores a map (not illustrated) in which the value of the intermittent stop timer Ts and the threshold Z are associated with each other as in FIG. 8, and determines the threshold Z corresponding to the value (intermittent stop time) of the intermittent stop timer Ts based on the map.

The processes in steps S44 to S46 are the same as the processes in steps S13 to S15 in the first embodiment, and therefore description thereof will be omitted.

In step S47, the ECU 50 reads the current cumulative air amount Gs, and determines whether the cumulative air amount Gs is smaller than the threshold Z. When the value of the cumulative air amount Gs is smaller than the threshold Z, the process proceeds to step S48. On the other hand, when the value of the cumulative air amount Gs is equal to or larger than the threshold Z, the process proceeds to step S49. The processes in steps S48 to S52 are the same as those in steps S17 to S21 in the first embodiment, and therefore description thereof will be omitted.

According to the present embodiment, it is possible to inhibit an increase in the PN, as in the first embodiment. Further, the threshold Z for determining the time period over which the intake air amount reduction control is executed is calculated based on the relationship illustrated in FIG. 8. Thus, the intake air amount reduction control is executed over a longer time as the intermittent stop time becomes longer, as in the first embodiment. Thus, it is possible to inhibit an increase in the PN while preventing the time period over which the output is reduced due to the execution of the intake air amount reduction control from being unnecessarily prolonged, as in the first embodiment.

In particular, in the second embodiment, the time period over which the intake air amount reduction control is executed is determined based on the cumulative air amount from the restart of the internal combustion engine 3. Therefore, the time period over which the intake air amount reduction control is executed can be set to a period long enough to inhibit an increase in the PN. In the second embodiment, the in-cylinder temperature of the internal combustion engine 3 can be accurately recognized by using the cumulative air amount, even when the intake air amount reduction control is not executed in a normal operation. Therefore, the time period over which the intake air amount reduction control is executed can be determined more appropriately than in the first embodiment. Thus, it is possible to reliably prevent the intake air amount reduction control from being prolonged, while inhibiting an increase in the PN.

The present disclosure is not limited to the foregoing embodiments, and may be implemented in various embodiments within the scope of the present disclosure. In the foregoing embodiments, the present disclosure is applied to an internal combustion engine mounted in a hybrid vehicle, as an internal combustion engine that is restarted from the intermittent stop. However, an internal combustion engine to which the present disclosure is applied is not limited to an internal combustion engine mounted in a hybrid vehicle. The present disclosure is also applicable to, for example, an internal combustion engine mounted in a vehicle provided with a stop-and-start system that stops the internal combustion engine when the vehicle stops and restarts the internal combustion engine when the vehicle starts traveling.

Whether the intake air amount reduction control is executed is determined based on the air load factor correlated with the intake air amount in the control in each of the foregoing embodiments. Alternatively, whether the intake air amount reduction control is executed may be determined based on the intake air amount or the fuel injection amount. Further, the intake air amount reduction control is executed by selecting the small lift mode in the control in each of the foregoing embodiments. However, the configuration of a variable valve mechanism capable of adjusting the intake air amount is not limited to any particular configuration, as long as a method of reducing the intake air amount can be employed. For example, the intake air amount reduction control may be executed by retarding a valve opening timing of an intake valve with respect to a normal valve opening timing.

What is claimed is:

1. A control device for ar interval combustion engine, the internal combustion engine including a throttle valve that adjusts an opening degree of an intake passage and a variable valve mechanism capable of adjusting an intake air amount, the internal combustion engine configured to be capable of restarting from an intermittent stop, the control device comprising:
    an electronic control unit configured to
    apply an intake air amount reduction control to a restart of the internal combustion engine from an intermittent stop when an intermittent stop time of the intermittent stop is equal to or longer than a prescribed time, the intermittent stop time being a stop time from an immediately preceding intermittent stop of the internal combustion engine to a current restart of the internal combustion engine, and
    restart the internal combustion engine from intermittent stop with the intake air amount reduction control applied,
    wherein the intake air amount reduction control is a control of reducing the intake air amount by operating the variable valve mechanism with the throttle valve kept fully closed,
    wherein the electronic control unit is configured to select one lift mode from a plurality of lift modes having different lift conditions from each other,
    wherein, in the intake air amount reduction control, the variable valve mechanism is controlled such that a lift amount of the plurality of lift modes increases as the intermittent stop time increases, and
    wherein, in the intake air amount reduction control, the throttle valve is kept fully closed regardless of the lift mode selected.

2. The control device according to claim 1, wherein
    the electronic control unit is configured to control the internal combustion engine such that a time that the intake air amount reduction control is executed increases as the intermittent stop time increases.

3. The control device according to claim 1, wherein
    wherein the plurality of lift modes includes a small lift mode and a large lift mode, the electronic control unit is configured to execute the intake air amount reduction control by selecting the small lift mode, and the electronic control unit is configured to end the intake air amount reduction control within a time range set before a time at which a magnitude relationship between an air load factor when the small lift mode is selected with the throttle valve kept fully closed and an air load factor when the large lift mode is selected with the throttle valve kept fully closed is reversed.

4. The control device according to claim 1, wherein the internal combustion engine is configured to be operated at a prescribed target air-fuel ratio.

5. The control device according to claim 1, wherein the electronic control unit is configured to start the internal combustion engine after the intake air amount reduction control is applied when a fuel injection amount equal to or larger than a prescribed amount is required.

* * * * *